(12) United States Patent
Holger et al.

(10) Patent No.: US 10,583,399 B2
(45) Date of Patent: Mar. 10, 2020

(54) MODULAR DISTRIBUTOR HEAD FOR MEMBRANE HOUSING BODIES

(71) Applicants: Knappe Holger, Malataverne (FR); Knappe Nils, Malataverne (FR)

(72) Inventors: Knappe Holger, Malataverne (FR); Knappe Nils, Malataverne (FR)

( * ) Notice: Subject to any disclaimer, the term of this patent is extended or adjusted under 35 U.S.C. 154(b) by 0 days.

(21) Appl. No.: 15/548,209

(22) PCT Filed: Feb. 5, 2016

(86) PCT No.: PCT/EP2016/052465
§ 371 (c)(1),
(2) Date: Aug. 2, 2017

(87) PCT Pub. No.: WO2016/124726
PCT Pub. Date: Aug. 11, 2016

(65) Prior Publication Data
US 2018/0021731 A1    Jan. 25, 2018

(30) Foreign Application Priority Data
Feb. 5, 2015    (EP) .................................... 15153988

(51) Int. Cl.
*B01D 65/00* (2006.01)
*B01D 61/02* (2006.01)
(Continued)

(52) U.S. Cl.
CPC ........ *B01D 65/00* (2013.01); *B01D 2313/105* (2013.01); *B01D 2313/125* (2013.01); *B01D 2313/21* (2013.01); *B01D 2313/54* (2013.01)

(58) Field of Classification Search
None
See application file for complete search history.

(56) References Cited

U.S. PATENT DOCUMENTS

| 3,006,680 A | 10/1961 | Gregory |
| 3,504,796 A | 4/1970 | Bray |

(Continued)

FOREIGN PATENT DOCUMENTS

| DE | 3639932 | 6/1988 |
| DE | 20316956 | 2/2004 |

(Continued)

OTHER PUBLICATIONS

PCT International Search Report, dated Aug. 4, 2016, issued in parallel application PCT/EP2016/052465, 2 pages.
(Continued)

*Primary Examiner* — Benjamin M Kurtz
(74) *Attorney, Agent, or Firm* — Nash and Titus, LLC (57) ABSTRACT

Subject-matter of the invention is a modular distribution head for a membrane housing body including a front side, a pipe connection to the membrane housing body, a gasket to seal the membrane housing body which is placed in the pipe connection, at least two flow openings in the distribution head through which the liquid can flow in and out of the distribution head and the membrane housing body whilst the flow opening is e.g. a liquid inlet, a permeate outlet or a concentrate outlet. The use of the distribution head or plant as per the invention leads to a considerable reduction in space required. In addition to less required space, a further advantage of the distribution heads as per the invention is that the connector pieces and the hydraulic connections are no longer necessary since the distribution heads are directly connected to each other and less collector pipes are needed in a plant.

20 Claims, 7 Drawing Sheets

(51) Int. Cl.
*C02F 1/44* (2006.01)
*B01D 61/08* (2006.01)

(56) References Cited

U.S. PATENT DOCUMENTS

| | | | |
|---|---|---|---|
| 3,654,967 A | 4/1972 | Atwell | |
| 3,872,014 A | 3/1975 | Schell | |
| 3,931,670 A | 1/1976 | Arnold | |
| 3,962,096 A | 6/1976 | Ishii | |
| 4,016,078 A | 4/1977 | Clark | |
| 4,172,798 A * | 10/1979 | Kronsbein | B01D 35/14 |
| | | | 210/446 |
| 4,202,377 A | 5/1980 | Harrison | |
| 4,218,317 A | 8/1980 | Kirschmann | |
| 4,522,716 A | 6/1985 | LaValley | |
| 4,687,026 A | 8/1987 | Westman | |
| 4,990,248 A | 2/1991 | Brown | |
| 5,096,584 A | 3/1992 | Reddy | |
| 5,230,437 A | 7/1993 | Kelly | |
| 5,232,593 A | 8/1993 | Pedersen | |
| 5,282,964 A | 2/1994 | Young et al. | |
| 5,425,877 A | 6/1995 | Knappe | |
| 8,141,590 B2 | 3/2012 | Knappe | |
| 2006/0124517 A1 * | 6/2006 | Scaringe | B01D 61/08 |
| | | | 210/137 |
| 2008/0110504 A1 | 5/2008 | Johnson et al. | |
| 2009/0173690 A1 | 7/2009 | Oklejas, Jr. | |
| 2010/0032043 A1 | 2/2010 | Knappe | |
| 2011/0031176 A1 * | 2/2011 | Knappe | B01D 63/00 |
| | | | 210/236 |
| 2012/0074053 A1 * | 3/2012 | Collignon | B01D 63/046 |
| | | | 210/209 |

FOREIGN PATENT DOCUMENTS

| | | |
|---|---|---|
| EP | 0442457 | 0/8199 |
| EP | 0104958 | 4/1984 |
| EP | 0601301 | 6/1994 |
| WO | WO 2004/057230 | 7/2004 |
| WO | WO 2005/028760 | 3/2005 |
| WO | WO 2006/017887 | 2/2006 |
| WO | WO 2008/037274 | 4/2008 |
| WO | WO 2009/036717 A2 | 3/2009 |
| WO | WO 2009/124559 | 10/2009 |
| WO | WO 2012/1015835 A1 | 8/2012 |

OTHER PUBLICATIONS

EPO Search Report in parallel European patent application EP 15153988, 3 pages, dated Jul. 8, 2015.

* cited by examiner

MODULAR DISTRIBUTOR HEAD FOR MEMBRANE HOUSING BODIES

Subject-matter of the invention is a modular distribution head for a membrane housing body including a front side, which is one side of the distribution head, a pipe connection for the membrane housing body, which is used to seal the membrane housing body and which is arranged on the side of the distribution head opposite to the front side, a gasket to seal the membrane housing body, which is placed in the pipe connection, at least two flow openings through which the liquid can flow in and out of the distribution head and the membrane housing body.

STATE OF THE ART

Internationally, there is a great need for drinking water whilst in many regions the need for clean water is greater than the available resources. Access to clean drinking water is of great importance worldwide. The demand for fresh water increases constantly due to the steady population growth and greater prosperity in many countries. Thus, there are a number of processes for drinking water production and water treatment to provide such fresh water. Osmosis processes such as reverse osmosis or nano- and ultra-filtration are used to produce drinking water through desalination of sea water and the treatment of brackish water.

Membranes in the form of membrane elements are used to carry out osmosis or filter water or other liquids.

In addition to its importance as drinking water, water is also used increasingly to generate energy e.g. power generation through osmosis. This process separates salt water and fresh water using a membrane. Water molecules diffuse through the membranes into the salt water so that pressure is established in the chamber with the salt water. This pressure can be used to drive a turbine. The membranes are housed in a vessel which can withstand great pressures and has a large capacity.

The membrane vessels are connected in greater plants so that the drinking water production plant is linked across 100 membrane vessels to each other. The membrane vessels are sealed with a final section and usually have either one straight connector (endport) or a side connector (sideport). The membrane vessel is connected to a collection vessel using a collector via a straight connector or side connector. The connection for an endport is done via a curved pipe (arch) and two hydraulic couplings; for a sideport via one hydraulic coupling part. The hydraulic coupling part or one of the hydraulic coupling parts is fastened at one connector, most often a side connector, of the membrane vessel. Both the side connectors, the bends as well as the hydraulic coupling parts require space so that the two membrane vessels must always be positioned at sufficient distance from each other. The plants require accordingly a lot of space to be able to connect the end or side connectors via the hydraulic coupling parts.

The hydraulic coupling parts are also expensive as they are mostly made of stainless steel. For a plant with many membrane vessels which are coupled to each other it becomes a cost item for the number of hydraulic coupling parts for sideports and for endports also the number of bends.

A further problem which occurs during the maintenance of plants with membrane vessels is that membrane vessels come in different sizes i.e. with different diameters and lengths and for different pressure levels. Connectors also come in different sizes. Therefore, different end sections to close the membrane vessels, different side sections, different bends and different couplers are needed for the different plants. This has the consequence that production, warehousing and procurement of spare parts is more difficult and that often not all sizes are in stock. Specifically drinking water treatment plants are often installed in remote areas, adding to this also transport difficulties.

The WO 2012/006362 A2 describes a desalination plant with several membrane vessels. It says that a standard plant for water treatment has a significant footprint. To solve this problem, a mega membrane vessel is used which houses a number of fluid distribution pipes and membrane elements. This enables a concentration of a greater number of membrane elements on a smaller area and thus less connectors are needed between the membrane vessels to the collector vessel. The system has, however, the disadvantage that the individual membrane vessels are very large and that a lot of components have to be dismantled for a maintenance or when replacing a pressure pipe or membrane element. Furthermore, such a vessel is technically complex and expensive.

The object of the invention is to provide a distribution head for a membrane housing body which allows a space-saving installation of a plant with multiple membrane housing bodies and that is also easy to maintain. The distribution head is to offer a more cost-effective connection from a membrane housing body for the collector and enable a reduction of the number of required components in a plant.

DESCRIPTION OF THE INVENTION

The invention solves the task with a modular distribution head as per claim 1.

Further designs are contained in the sub-claims or described below.

The distribution head (Multiport) as per the invention is used to close a membrane housing body and is placed on the opening of the membrane housing body. The distribution head has a front side which is one side of the distribution head and a pipe connection for the membrane housing body which is used to seal the membrane housing body. This pipe connection is arranged on the side of the distribution head which is opposite the front side.

A gasket, preferably a lip seal, is placed in the pipe connection to seal the membrane housing body. The front side is the side of the distribution head, which is visible on the side of the entire plant once the distribution head is fitted, i.e. if you look at the plant from the front. The distribution head also has at least two flow openings through which the liquid can flow in and out of the distribution head and the membrane housing body. The flow opening is either a liquid inlet (feed) through which the original liquid e.g. salt water or brackish water flows into the membrane housing body or a liquid outlet e.g. a filtrate outlet, a permeate outlet or a concentrate outlet through which liquid e.g. filtrate, permeate or concentrate can drain out of the membrane housing body. Suitable liquids which flow through the interconnections are e.g. water, chemicals, food depending on application area.

The distribution head as per the invention has on the inside at least a collector room to collect the liquid. This liquid can e.g. either be the liquid flowing into the membrane housing body or the liquid that flows out of the membrane housing body. The flow openings of the distribution head are arranged perpendicularly to the front side and have a coupling part each which is integrated into the distribution head. Using these coupling parts, the flow openings of two adjacent distribution heads can be connected directly without any additional external hydraulic coupling parts. This creates an interlocking, liquid-tight connection between the distribution heads. This achieves a very small gap between two adjacent distribution heads (which only corresponds to the thickness of the integrated coupling part). The distribution head as per the invention is preferably a hybrid of plastic component and aluminium core which is at least partially manufactured in an injection moulding process.

As per the invention, a membrane housing body is understood as a membrane housing, a membrane pressure pipe, a membrane container or membrane vessel in which one or several membrane elements are placed. The membrane housing body is not part of the membrane structure itself, but is the cylindrical container accommodating the membrane or the membrane element.

It is pressure resistant even at high pressures of up to 100 bar liquid pressure.

The distribution head as per the invention has at least one cavity to hold a closing tensile element whilst the cavity is arranged in parallel to the front side. If as per the invention, at least two distribution heads, preferably 2-8, specifically preferred 4-8 distribution heads, are placed side by side, then a closing tensile element can be guided through the cavities of the relevant adjacent distribution heads. The tensile element has in its design a length which is greater than the overall length of the distribution heads and is in each case fitted to the outside so that the distribution heads are fixed to each other and cannot be moved. This creates a very space-saving connection.

The distribution heads are thus positioned in such a way that the flow opening of the first distribution head is coupled liquid-tight to the flow opening of the adjacent second distribution head. An additional hydraulic coupling part or a stainless steel nozzle is not needed for connection.

In one design, the distribution head has a compression plate, which is arranged perpendicularly to the front side and has openings to hold the closing tensile elements which are arranged congruently to the cavities. The use of a compression plate allows the tensile force, which affects the distribution head and keeps the distribution heads together, to be spread more evenly. The compression plate is either designed as an end plate so that it forms a closed plate which closes the flow opening or with a connector piece to form the connection of a pipeline with hydraulic coupling part. The compression plate is for example a plate made from aluminum or a plastic coated steel part. The tensile elements are preferably tie rods or tension cables, for example a metal rod, a fiber composite cable or a steel cable. It is possible to tighten the tensile element with a fastening e.g. a nut.

In one design, the distribution head as per the invention is designed as an inlet section (feed). In this design, the distribution head is fastened to the side of the membrane housing body through which the liquid to be treated flows into the plant.

The distribution head has in this design a collector room to collect the liquid.

In another design, the distribution head as per the invention is designed as an outlet section. For this design, the distribution head is fastened to the side of the membrane housing body through which the treated liquid, i.e. the permeate and concentrate (retentate) flows out of the plant. The distribution head in this design has two collector rooms, one for collecting the permeate and one for collecting the concentrate.

The distribution head as per the invention is preferably cuboid, cubic or cylindrical.

In one design, a connector piece is coupled to the coupling part of the flow opening of the distribution head as per the invention. The distribution head can be coupled via the connector piece using a pipeline to the liquid inlet or outlet. This coupling takes place e.g. via a hydraulic coupling part.

In one design, the distribution head as per the invention has a core element e.g. an extruded aluminium profile. The core element has bores for the different flow openings. The core element has a plastic cover which is preferably manufactured using injection moulding. In this design, manufacturing the interconnection is done in at least the following steps:

Provision of an extruded aluminium profile,
Drilling the bores in the profile,
Inserting the drilled aluminium profile into an injection moulding tool and coating the aluminium profile with plastic.

The distribution head has a greater rigidity thanks to the use of a three-dimensional profile as the core element instead of a two-dimensional plate.

Technically, it is possible to manufacture Multiports with large connections of e.g. 4 inches. The plastic moulding is used to protect the aluminium profile against contact with liquids.

Preferably, the distribution heads as per the invention and the large connection on the inlet to eight membrane housing bodies are interconnected i.e. placed next to each other in a sequence on one level and coupled liquid-tight to each other.

In one design, the distribution head as per the invention has a diffuser which is fitted in the pipe connection. The diffuser is preferably a plate with several flow openings, which are preferably distributed evenly over the plate. The diffuser is used to distribute the liquid flow as evenly as possible across the entire pipe cross-section. In conventional pressure pipes, the feed is done via an inlet placed on one side of the membrane cross-section. In this way, the membrane is not optimally utilised across its entire width. When using sideports, the flow between the opposing sideports at inlet and outlet is stronger than across the entire width which may lead to the liquid distributing unevenly on the front face. The utilised membrane is not used to its full potential. The distribution head on the inlet feeds the medium centrally on the front face of the membrane. The diffuser ensures a better utilisation of the membrane since the inflow is more even.

In an additional design, the distribution head as per the invention has a flow reducer to regulate the flow rate. Preferably, the flow reducer is designed as a ring. The flow reducer is placed in the pipe connection of the interconnection. By selecting the flow reducer, the amount of liquid flowing into the membrane housing body and the flow speed can be controlled. Measuring the differential pressure between the inlet and the retentate allows to determine whether the membrane works in the normal range.

This allows to evenly spread the flow quantity on the interconnected pressure pipes.

From the WO 2009/124559 A1, cylindrical membrane housing bodies are known which are preferably combined with the distribution head as per the invention. The distribution head as per the invention is then fitted on a membrane housing body which is made up of an inner element, a radial fibre wrap and a cover. The cover houses at least two tensile elements. The distribution head in this case has recesses which are perpendicular to the front side and in which the axial tensile elements of the membrane housing bodies are arranged.

The distribution heads as per the invention are used preferably for the membrane housing bodies for the application areas nanofiltration (NF), ultrafiltration (UF), microfiltration (MF), filtration of various media, ion exchange, reverse osmosis (RO), forward osmosis (FO) and osmosis. These processes are e.g. used for sea water or brackish water desalination or for energy generation.

The object is further solved by a plant for water treatment or energy generation comprising at least one membrane housing body, at least one membrane element in each membrane housing body and at least one distribution head as per the invention. Membrane housing bodies are preferred as described in WO 2009/124559 A1.

In a design, the plant as per the invention has eight adjacent membrane housing bodies which are coupled via the distribution heads as per the invention. For a variant, the membrane housing bodies are stacked in a container. The plant as per the invention can each have e.g. eight adjacent, connected membrane housing bodies in eight stacked rows i.e. a total of 64 pipes with distribution head, which are placed in a 20 foot container.

It is preferred, that the plant as per the invention is placed in a container without walls, roofs or doors i.e. the container is only used as a frame. Thus, it is possible to place up to 64 membrane housing bodies in a container if the container is 20 foot in size. For a conventional system, a significantly lower number of membrane house bodies can be placed in the container, since standard membrane housing bodies with their connections require a much larger footprint. If the membrane housing bodies are permanently installed in the container, then the container can be used as a rack which can be placed directly into the hall or outdoor area where the plant is to be built and operated. The plant is fully assembled and only needs to be connected to the inlets and outlets.

The use of the distribution heads or plant as per the invention leads to a considerable reduction in required space. With the invented system, it is possible to significantly reduce the building size which is needed for the installation of a plant with several hundred pipes. A standard pressure pipe with a sideport has a width of e.g. 330-340 mm, measured from nozzle to nozzle. This leads to a minimum space requirement of approx. 660 to 680 mm for coupling of two standard pressure pipes. With the distribution head as per the invention, only approx. 500 mm are needed for the same dimension of the membrane housing bodies for two pressure pipes, since one pressure pipe with distribution head has a width of e.g. 250 to 255 mm.

A cylinder protrudes at the side for a standard side connection (sideport) at the end section. This has to be connected to the cylinder of the adjacent membrane housing body via a coupling part or clamp. This means that for a standard system e.g. 4 pressure pipes or 8 pipes adjacent to each other have a significant space requirement e.g. for 8 pipes next to each other, the required space is approx. 2.7 m. If using the distribution head as per the invention, the space requirement is significantly smaller.

In addition to less required space, a further advantage of the distribution heads as per the invention is that the connector piece and the hydraulic connections between the membrane housing bodies are no longer necessary since the distribution heads are directly connected to each other. Accordingly, hydraulic coupling parts and connector pieces are saved which are currently made of stainless steel and are thus comparatively expensive. The collector in the distribution heads are connected directly without hydraulic ports.

The invented system also has the advantage that a design can be used for several pressure stages and that it is no longer necessary to have connections in a range of inch sizes. Previously separate components for systems for the pressure stages 21, 31, 42, 70 and 84 bar with 1-8 membrane elements had to be provided and for side connections (Sideports) in e.g. 1.5 inch, 2 inch, 2.5 inch, 3 inch or 4 inch, it is now possible for this number of components to be greatly reduced using the distribution head as per the invention.

The distribution heads as per the invention can each be placed on the open end of the cylindrical membrane housing body. This has the advantage that unlike e.g. for sideports there is no need for bores in the side walls of the membrane housing body and large openings (4 inch for 8 inch large membrane housing bodies) are possible. The bores impair the strength/stability in a classical membrane housing body since it is an interference with the structure of the side wall. There is thus always a certain risk that micro-cracks form around the bore which affects the stability. Since no material weakening bores are necessary when using the distribution head as per the invention, the risk of micro-cracks is also eliminated accordingly.

A further problem with the conventional system is the maintenance. Every side connection is connected via hydraulic coupling parts. The coupling parts are designed as half-shells. The pressure pipes are each sealed with lip seals. If a lip seal is defect, then for standard system all connections for the liquid inlets and outlets have to be dismantled since it is not possible to dismantle the end sections and coupling parts individually.

Since there is no gap between the individual components, it is e.g. not possible to insert a lip seal into the system without dismantling it. For the distribution head as per the invention and the plant as per the invention, a distribution head can be dismantled individually and the seal can be replaced accordingly on the dismantled distribution head without having to dismantle the hydraulic coupling parts or pipelines on the feed, retentate or concentrate inlet. Even if membrane housing bodies have to be replaced, it is not necessary for the Multiports as per the invention to dismantle these liquid connections or to also remove adjacent membrane housing bodies.

The invention is explained in more detail using these drawings. It shows

Drawing 1a a distribution head as per the invention for the liquid inlet which is mounted on the membrane housing body, Drawing 1b the distribution head as per the invention according to drawing 1a without membrane housing body, Drawing 2 a section through the distribution head as per the invention as per drawing 1a, Drawing 3 the distribution head as per the invention according to drawing 1a with connector pieces, Drawing 4a a distribution head as per the invention for the liquid outlet which is mounted on the membrane housing body, Drawing 4b the distribution head as per the invention according to drawing 4a without membrane housing body Drawing 5 a section through a distribution head as per the invention as per drawing 4a, Drawing 6 a membrane housing body without distribution heads, Drawing 7 a section through four connected distribution heads as per drawing 1a, Drawing 8 a section through four connected distribution heads as per drawing 4a, Drawing 9 a longitudinal section through a plant as per the invention with four membrane housing bodies and four connected distribution heads each at the inlet and outlet side of the membrane housing body and Drawing 10 a top view of the front side of the distribution head from drawing 4b.

Figure 1A:
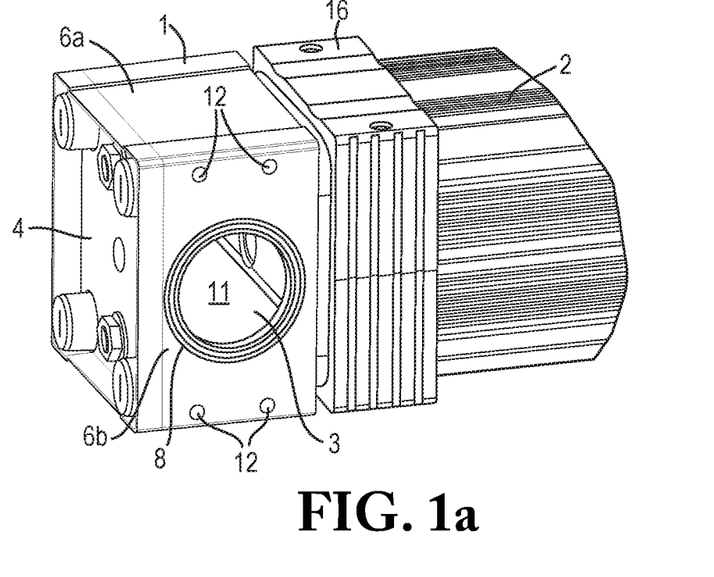

Drawing 1a shows a distribution head 1 as per the invention in the design as inlet section (feed). The distribution head 1 is connected to a membrane housing body 2, which is only partly shown. The distribution head 1 has two flow openings 3 of which only the front one is apparent and a front side 4. Two sides 6a and 6b of the distribution head 1 can be seen. The flow opening 3 is located on the side 6b. The flow opening 3 leads to a collector room 11, which is located on the inside of the distribution head 1. In the side 6b, there are also 4 openings 12 visible, which are used each to hold a closing tensile element 13. A coupling ring 8 is located at the flow opening 3 with which the distribution head 1 is coupled to an adjacent distribution head.

Figure 1B:
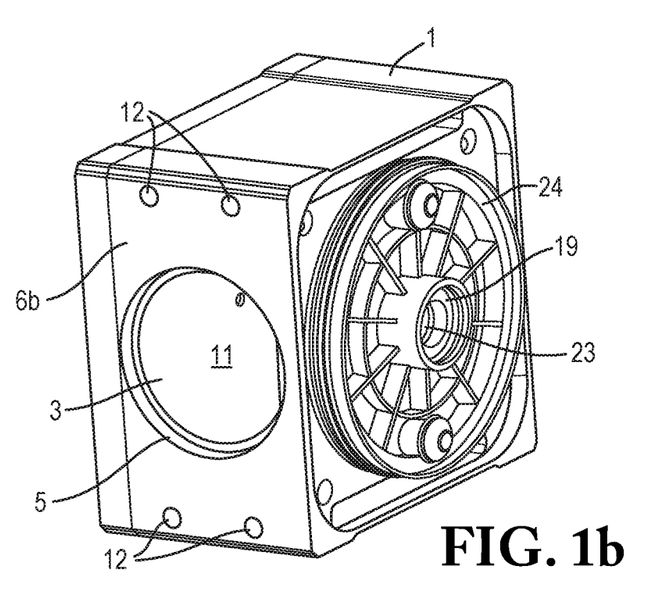

Drawing 1b shows the distribution head 1 as per drawing 1a without fitted membrane housing body 2. The pipe connection is closed with a back plate 24. The back plate 24 has a flow opening 23 to the membrane housing body. A flow reducer 19 is located in the flow opening 23. The flow opening 3 has a seat 5 for the coupler 8 which is not fitted here.

Figure 2:
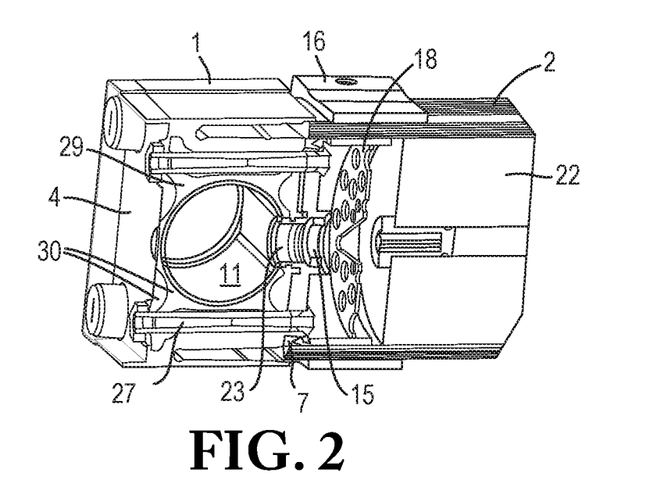

Drawing 2 shows a section through the distribution head 1 as per drawing 1. The distribution head 1 is fitted to a membrane housing body 2. A membrane element 22 is visible in the membrane housing body (not fully shown). Core element 29 is shown. An opening is located in the distribution head 1 opposite the front side 4 which is designed as pipe connection for the membrane housing body 2. The distribution head 1 also has an opening 27 for the pressure measurement on the inlet. The membrane housing body 2 is sealed with a circumferential seal 7. Plastic cover 30 is shown.

The liquid can flow from the collector room 11 through opening 23 into the membrane housing body.

Here the liquid flows through the flow reducer 19 which is designed as a ring. After passing through the flow reducer 19, the liquid flows through the diffuser 18 and is thus distributed evenly over the cross-section of the membrane element 22.

Figure 3:
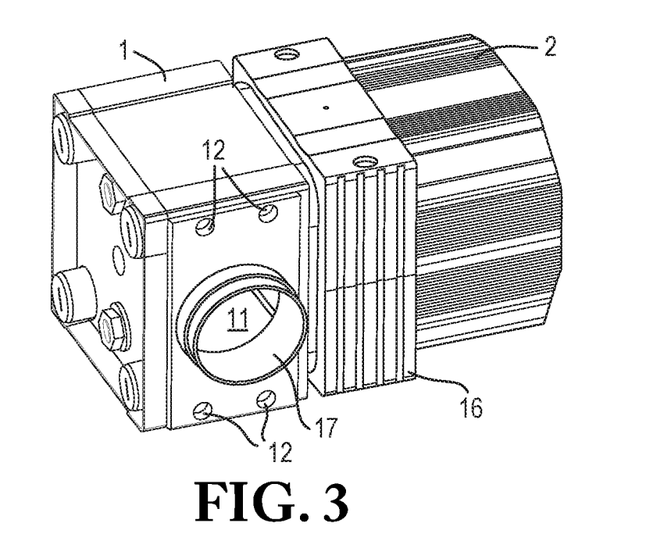

Drawing 3 shows the distribution head 1 as per drawing 1a with connector piece 17. The distribution head 1 can be coupled with the pipe to the liquid inlet via connector piece 17. Normally, the coupling is done via hydraulic coupling part.

Figure 4A:
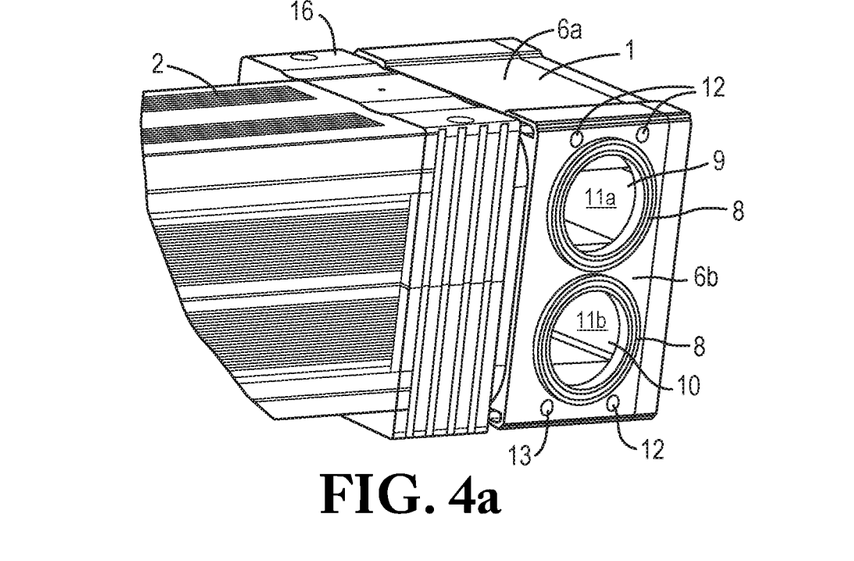

Drawing 4a shows a distribution head 1 as per the invention which is designed as an outlet section. In the side 6b of the distribution head, there is a flow opening 10 for the permeate and a flow opening 9 for the concentrate. The flow opening 9 leads to a collector room 11a for the concentrate whilst the flow opening 10 to a second collector room 11b for the permeate. The distribution head 1 has also four cavities 12 starting from the side 6b to accommodate the closing tensile elements.

Figure 4B:
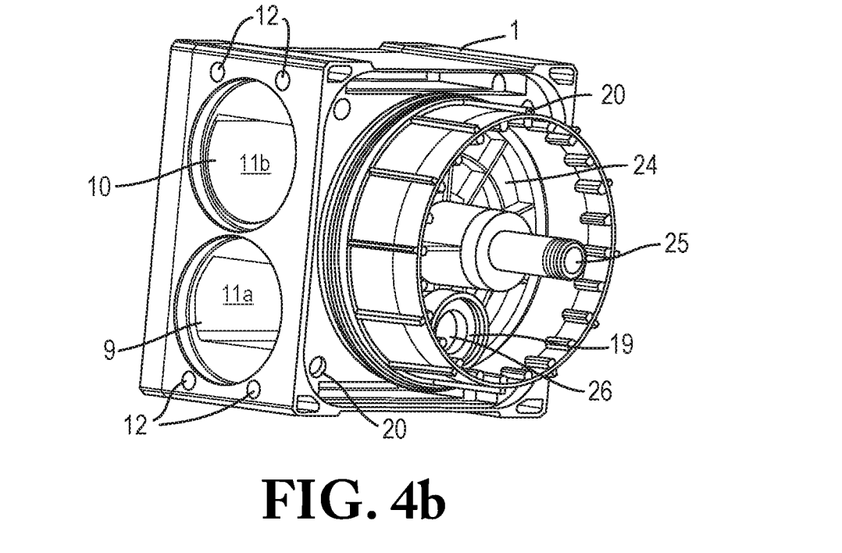

Drawing 4b has a visible distribution head 1 as per drawing 4a without fitted membrane housing body 2. The pipe connection is closed with a back plate 24. In the middle, a back plate 24 is located in the membrane connector 25. The permeate goes through the membrane connector 25 from the membrane into the permeate collector room 11b. In the back plate, there is also a concentrate outlet 26 through which the concentrate—potentially through a flow reducer—reaches the concentrate collector room 11a.

Figure 5:
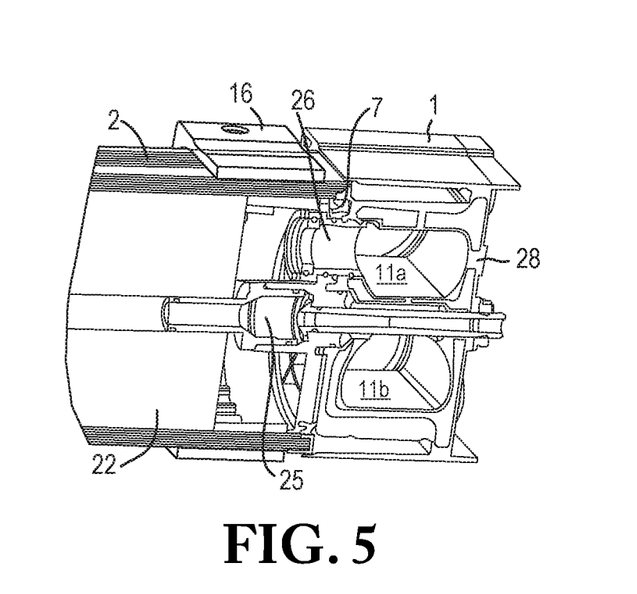

Drawing 5 shows a section through the distribution head 1 as per the invention as per drawing 4a. Collector room 11a for the concentrate and the collector room 11b for the permeate are visible. The membrane housing body 2 is also connected with the distribution head 1 via a gasket 7. The collector room 11a also has a connection 28 for a measuring lance for pressure measurement of the concentrate.

Figure 6:
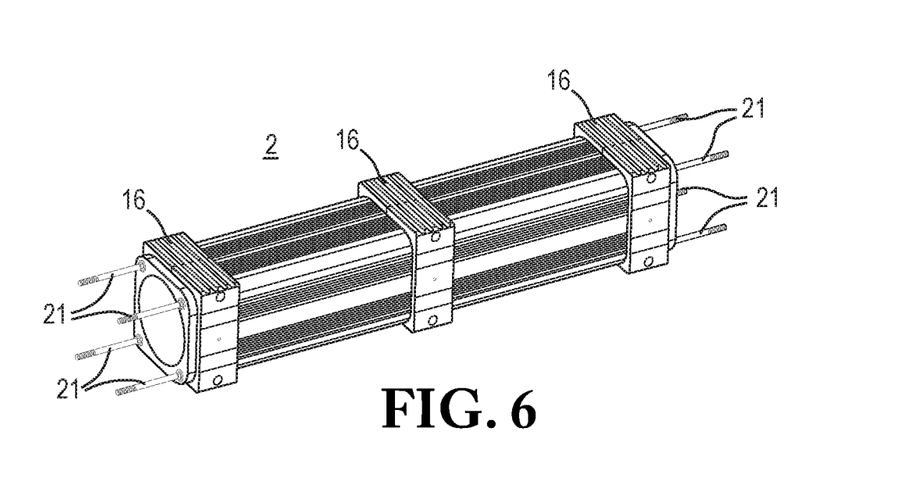

Drawing 6 shows a membrane housing body without distribution heads. Four axial tensile elements 21 are located in the membrane housing body 2. The membrane housing body 2 also has three saddles 16 in front of which the distribution heads 1 are placed. The saddles 16 are used to stack the membrane housing bodies 2 and to support the membrane housing body 2 on the floor.

Figure 7:
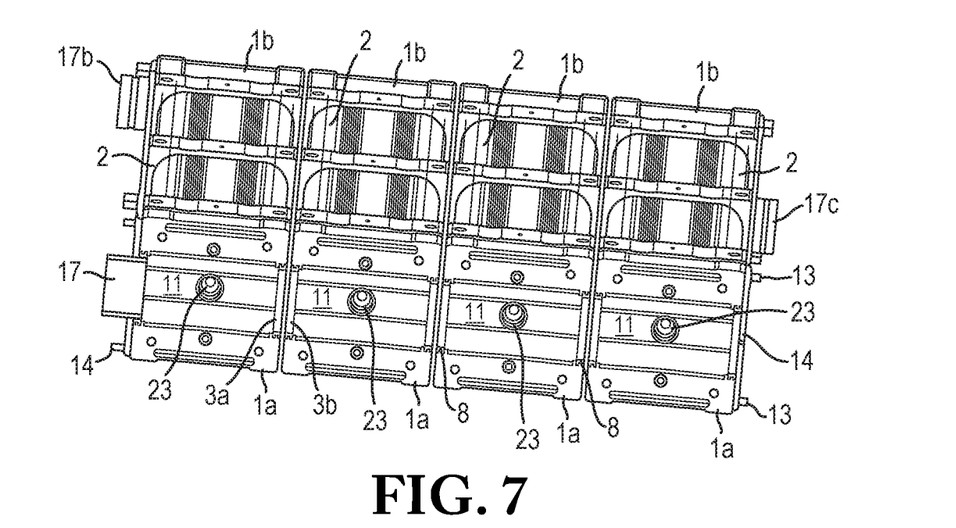

In drawing 7, a plant as per the invention is shown with four distribution heads 1 as per the invention on the feed side and four distribution heads 1 as per the invention on the permeate/concentrate side. There are four membrane housing bodies 2 between the two units of Multiports. The distribution heads 1a on the feed site are shown as sectional drawings. It is clear that each of the flow openings 3a and 3b of 2 adjacent distribution heads are connected to each other via the coupler 8. The distribution heads 1 are held together through four closing tensile elements 13. Compression plates 14 are located on the outside of the relevant outer distribution heads. Each distribution head 1 has a flow opening 23 to the membrane housing body. The cross-section shows the open collector rooms 11 in each of the distribution heads. The connector pieces 17b are in the rear to drain the concentrate and 17c to drain the permeate.

Figure 8:
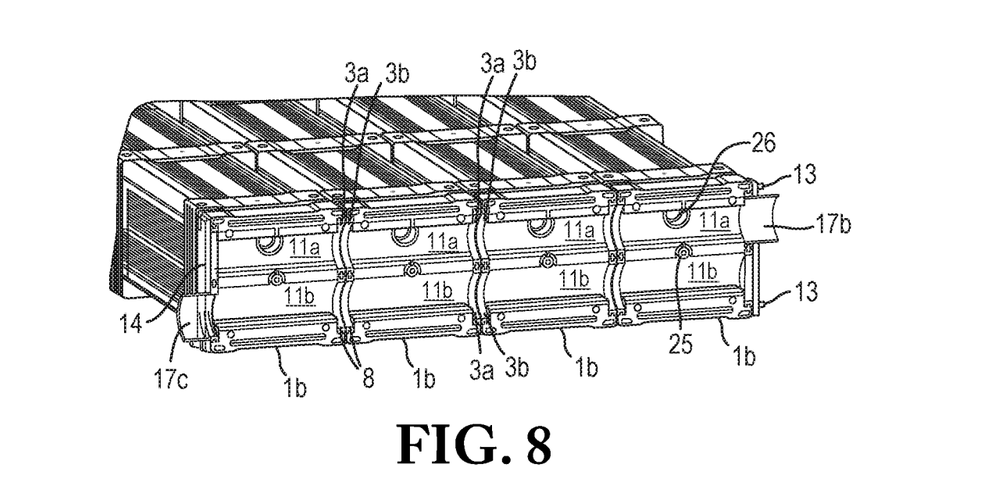

Drawing 8 shows a section of the plant from drawing 7 from the rear. The distribution heads 1b are here shown as section drawings. It is clear that each distribution head 1b has collector rooms 11a and 11b. Each of the collector rooms 11a for the distribution heads 1b are connected to each other via flow openings. Also, the collector rooms 11b are connected to each other via flow openings. On the outer end of the collector rooms 11a is a connection nozzle 17b visible. On the other side at the outer edge of the connected collector rooms 11b is a connection nozzle 17c visible. The individual distribution heads 1 are also held together through closing tensile elements 13.

Figure 9:
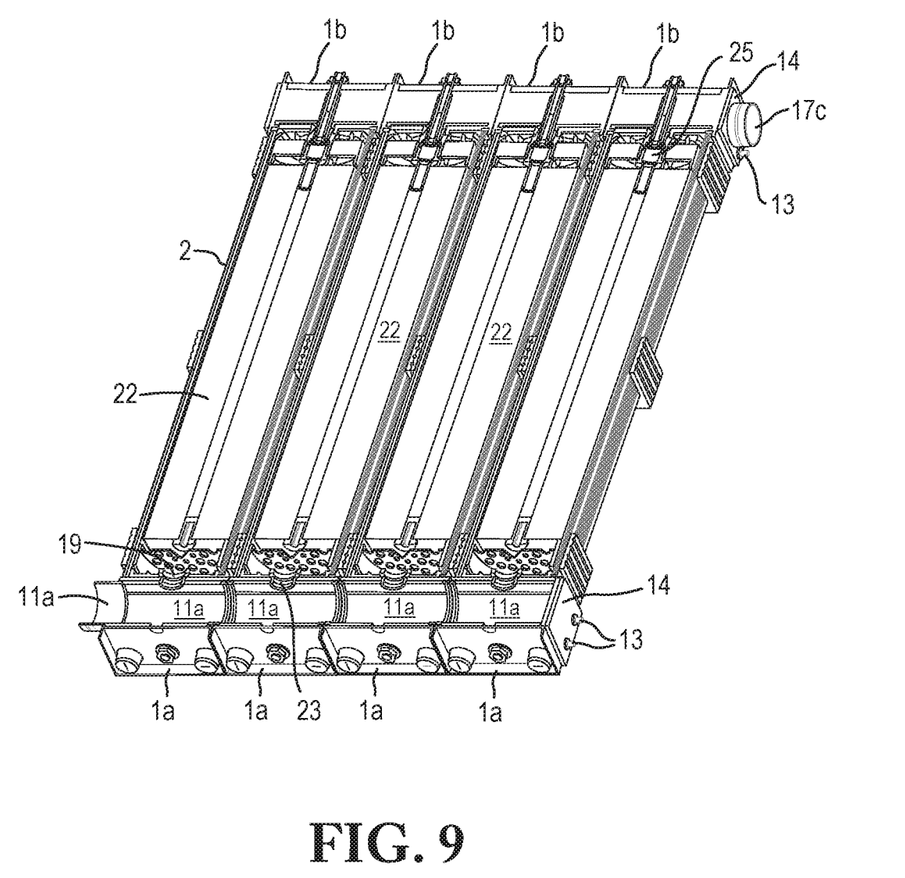

Drawing 9 shows a longitudinal section through the plant as per invention according to drawings 7 and 8. Liquid flows into the collector rooms 11a of the distribution heads 1a via the connection nozzles 17a. The liquid flows then via the flow openings 23 through the flow reducer 19 to the diffuser 18. The liquid is distributed over the cross-section of the membrane housing body 2 at the diffuser 18 and flows through the membrane elements 22. The liquid splits into concentrate and permeate then reaches at the other end of the membrane housing bodies 2 the collector rooms of the distribution heads 1b. The permeate leaves the plant again through the connection nozzles 17c.

Figure 10:
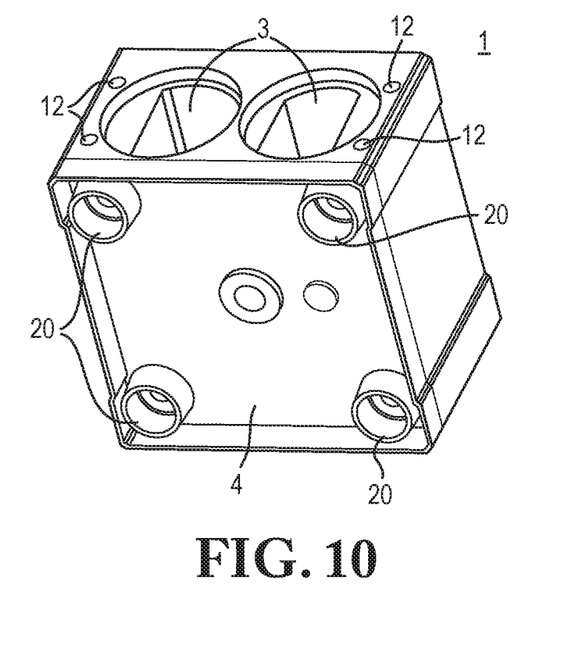

Drawing 10 shows a top view of the front side 4 of the distribution head 1 from drawing 4b. The recesses 20 for the axial tensile elements as well as the cavities 12 to hold the closing tensile elements are visible in the distribution head 1.

LIST OF REFERENCE SIGNS

1 Distribution head
2 Membrane housing body
3 Flow opening for feed
4 Front side
5 Seat for coupler
6 Side of the distribution head
7 Gasket 8 Coupler
9 Flow opening for concentrate
10 Flow opening for permeate
11 Collector rooms
12 Cavities to hold a closing tensile element
13 Closing tensile element
14 Compression plate
15 Openings in compression plate
16 Saddle membrane housing body
17 Connector piece
18 Diffuser
19 Flow reducer
20 Recesses for axial tensile elements
21 Axial tensile element
22 Membrane element
23 Flow opening to membrane housing body
24 Back plate
25 Membrane connector
26 Concentrate outlet
27 Opening for pressure measurement in the inlet
28 Connection for measuring lance
29 Core element
30 Plastic cover

The invention claimed is:

1. Modular distribution head for water desalination by reverse osmosis adapted for attachment to a membrane housing body, wherein the modular distribution head comprises
   a core element having at least two bores to form at least two flow openings in the modular distribution head through which liquid can flow into the modular distribution head and out of the modular distribution head to an attachable membrane housing body, wherein the modular distribution head has an inside in which is at least one collector space to collect liquid,
   a front side, which forms one side of the modular distribution head, wherein the at least two flow openings of the modular distribution head are arranged perpendicular to the front side and at opposite sides of the modular distribution head from each other,
   a pipe connection in the modular distribution head for connection with the attachable membrane housing body, which is adapted to seal off the attachable membrane housing body, and which is positioned on a side of the modular distribution head opposite to the front side of the modular distribution head, which pipe connection comprises a flow reducer ring positioned in the pipe connection, which flow reducer ring is adapted to regulate liquid flow rate from the modular distribution head into the attachable membrane housing body,
   a gasket capable of directly connecting the modular distribution head to an attachable membrane housing body and thereby to seal the attachable membrane housing body, which gasket is positioned in the pipe connection,
   and a plastic cover, wherein the plastic cover is produced by injection moulding so as to coat the core element and the at least two bores.

2. Modular distribution head according to claim 1, wherein the modular distribution head is cuboid, cubic or cylindrical.

3. Modular distribution head according to claim 1, wherein the modular distribution head has at least one cavity to hold at least one closing tensile element whilst the at least one cavity is located parallel to the front side.

4. Modular distribution head according to claim 3, wherein the modular distribution head has a compression plate, which is arranged perpendicular to the front side and has openings to hold the closing tensile element which are arranged congruently to the cavity, and wherein the compression plate is either an end plate closing the flow opening or further comprises a connector to form a pipeline connection with a hydraulic coupling part.

5. Modular distribution head according to claim 1, wherein the flow openings each have a coupler which is integrated into the modular distribution head or wherein a connecting piece is connected to the flow openings.

6. Modular distribution head according to claim 1, wherein the at least two flow openings are a liquid inlet (feed), a permeate outlet and/or concentrate outlet.

7. Modular distribution head according to claim 1, wherein the modular distribution head further comprises a diffuser positioned in the pipe connection to receive liquid flow from the flow reducer ring and distribute it to a membrane element positioned within the attachable membrane housing body.

8. Modular distribution head according to claim 1, wherein the modular distribution head has recesses which are perpendicular to the front side and in which axial tensile elements of the membrane housing body are arranged.

9. Modular distribution head according to claim 1, wherein the modular distribution head as a single component is effective at multiple water pressure stages with multiple water flow rates in water desalination by reverse osmosis.

10. Modular distribution head according to claim 1, wherein the membrane housing body has a pressure resistance of up to 100 bar of liquid pressure.

11. Modular distribution head according to claim 1, which is adapted for sea water or brackish water desalination by reverse osmosis.

12. Plant with at least one membrane housing body, at least one membrane element in each membrane housing body and at least one modular distribution head as per claim 1.

13. A water desalination installation comprising at least one membrane housing body and at least two modular distribution heads according to claim 1, which modular distribution heads are attached to the at least one membrane housing body, wherein the water is sea water or brackish water, and wherein the desalination is reverse osmosis desalination.

14. The water desalination installation according to claim 13, which comprises at least two membrane housing bodies, wherein the at least two modular distribution heads are adjacent to each other, and wherein each of the modular distribution heads has at least one cavity to hold at least one closing tensile element.

15. The water desalination installation according to claim 14, wherein the adjacent modular distribution heads are positioned by means of the at least one closing tensile element such that a flow opening in a first modular distribution head is coupled in a liquid-tight manner with a flow opening in a second adjacent modular distribution head.

16. The water desalination installation according to claim 13, wherein the at least one membrane housing body has a pressure resistance of up to 100 bar of liquid pressure.

17. Modular distribution head for water desalination by reverse osmosis adapted for attachment to a membrane housing body, wherein the modular distribution head is cuboid, cubic or cylindrical, which modular distribution head comprises
   a core element having at least two bores to form at least two flow openings in the modular distribution head through which liquid can flow into the modular distribution head and out of the modular distribution head to an attachable membrane housing body, wherein the modular distribution head has an inside in which is at least one collector space to collect liquid, a front side, which forms one side of the modular distribution head, wherein the at least two flow openings of the modular distribution head are arranged perpendicular to the front side and at opposite sides of the modular distribution head from each other, a pipe connection in the modular distribution head for connection with the attachable membrane housing body, which is adapted to seal off the attachable membrane housing body, and which is positioned on a side of the modular distribution head opposite to the front side of the modular distribution head, which pipe connection comprises a flow reducer ring positioned in the pipe connection, which flow reducer ring is adapted to regulate liquid flow rate from the modular distribution head into the attachable membrane housing body, a diffuser positioned in the pipe connection to receive liquid flow from the flow reducer ring and distribute it to a membrane housing element positioned within the attachable membrane housing body, a gasket capable of directly connecting the modular distribution head to an attachable membrane housing body and thereby to seal the attachable membrane housing body, which gasket is positioned in the pipe connection, at least one cavity to hold at least one closing tensile element, which at least one cavity is located parallel to the front side, recesses which are perpendicular to the front side and in which axial tensile elements of the membrane housing body are arranged, and a plastic cover, wherein the plastic cover is produced by injection moulding so as to coat the core element and the at least two bores.

18. Method for reverse osmosis desalination of sea water and/or brackish water comprising the step of causing sea water and/or brackish water to flow through at least one membrane element, which at least one membrane element desalinates the water by reverse osmosis, wherein the at least one membrane element is placed within at least one membrane housing body, and at least two modular distribution heads are each attached to the at least one membrane housing body to allow sea water and/or brackish water to flow to the at least one membrane housing body and thereby to the at least one membrane element to desalinate the water by reverse osmosis, wherein the at least two modular distribution heads each comprise a core element having at least two bores to form at least two flow openings in the modular distribution head through which sea water and/or brackish water can flow into the modular distribution head and out of the modular distribution head to the at least one membrane housing body, wherein the modular distribution head has an inside in which is at least one collector space to collect liquid, a front side, which forms one side of the modular distribution head, wherein the at least two flow openings of the modular distribution head are arranged perpendicular to the front side and at opposite sides of the modular distribution head from each other, a pipe connection in the modular distribution head for connection with the at least one membrane housing body, which is adapted to seal off the at least one membrane housing body, and which is positioned on a side of the modular distribution head opposite to the front side of the modular distribution head, which pipe connection comprises a flow reducer ring positioned in the pipe connection, which flow reducer ring is adapted to regulate water flow rate from the modular distribution head into the at least one membrane housing body, a gasket capable of directly connecting the modular distribution head to the at least one membrane housing body and thereby to seal the at least one membrane housing body, which gasket is positioned in the pipe connection, and a plastic cover, wherein the plastic cover is produced by injection moulding so as to coat the core element and the at least two bores.

19. The method according to claim 18, wherein the at least one membrane housing body has a pressure resistance of up to 100 bar of liquid pressure.

20. The method according to claim 18, wherein the modular distribution head as a single component is effective at multiple water pressure stages with multiple water flow rates.

* * * * *